April 21, 1953     H. A. TOULMIN, JR     2,635,389

METHOD OF PRODUCING CONTINUOUS GLASS FILAMENTS

Filed March 21, 1950     4 Sheets-Sheet 1

INVENTOR
HARRY A. TOULMIN JR
By Toulmin & Toulmin
ATTORNEYS

April 21, 1953 H. A. TOULMIN, JR 2,635,389
METHOD OF PRODUCING CONTINUOUS GLASS FILAMENTS
Filed March 21, 1950 4 Sheets-Sheet 2
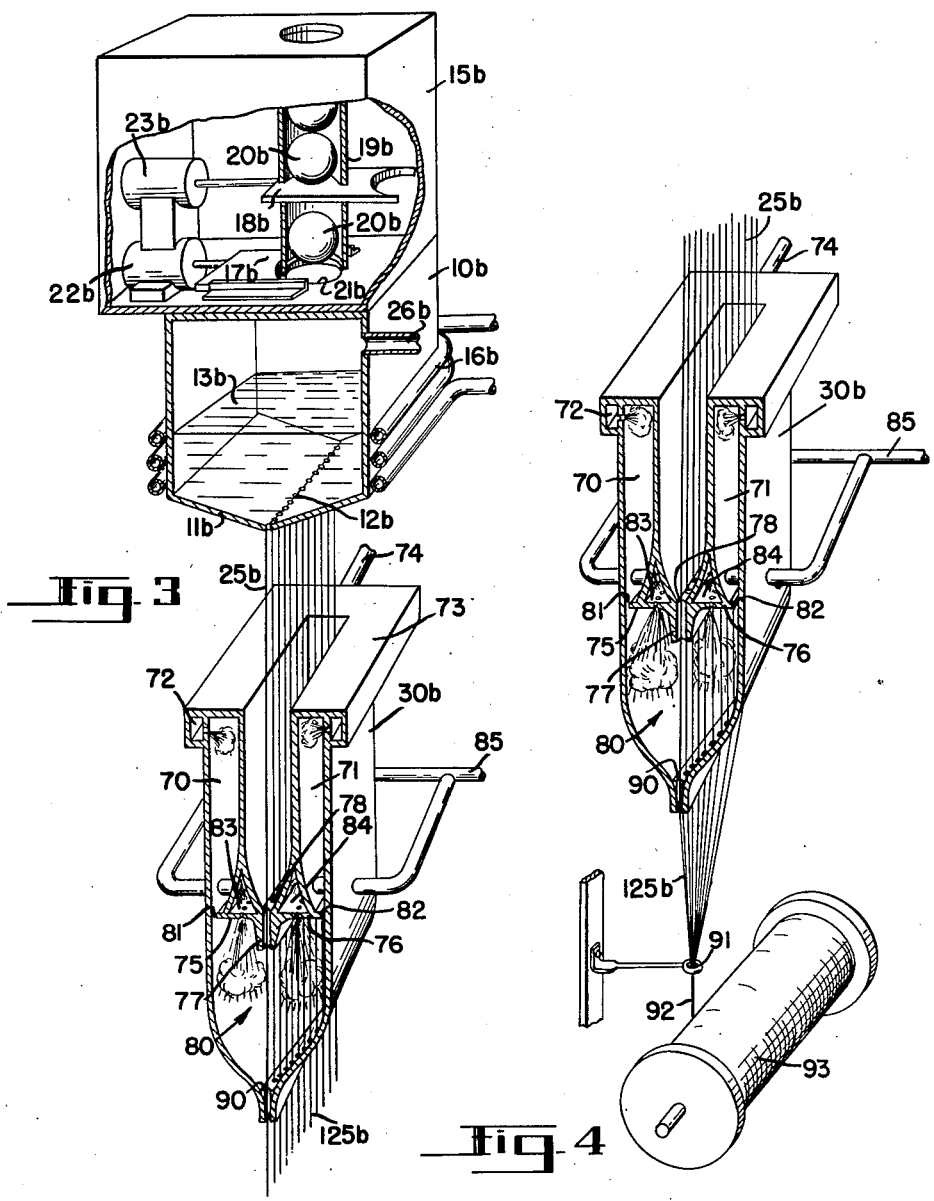
INVENTOR
HARRY A. TOULMIN JR.
BY
Toulmin & Toulmin
ATTORNEYS

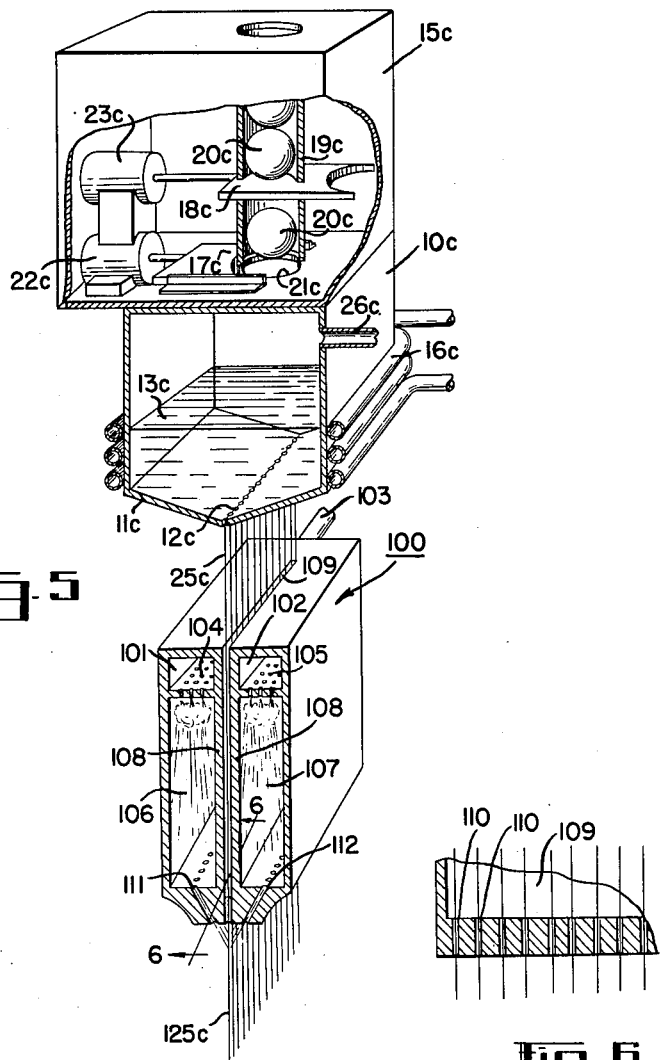

April 21, 1953     H. A. TOULMIN, JR     2,635,389
METHOD OF PRODUCING CONTINUOUS GLASS FILAMENTS
Filed March 21, 1950     4 Sheets-Sheet 4

INVENTOR
HARRY A. TOULMIN JR.
BY
*Toulmin & Toulmin*
ATTORNEYS

Patented Apr. 21, 1953

2,635,389

UNITED STATES PATENT OFFICE 2,635,389

METHOD OF PRODUCING CONTINUOUS GLASS FILAMENTS

Harry A. Toulmin, Jr., Dayton, Ohio, assignor to Glass Fibers, Inc., Waterville, Ohio, a corporation of Ohio Application March 21, 1950, Serial No. 150,833

2 Claims. (Cl. 49—77)

This invention relates to methods for producing continuous length glass filaments, and particularly to an improved method by which the production of continuous length glass filaments is greatly increased.

In the known methods of producing continuous length glass filaments, a body of glass is heated to a molten condition in a heating chamber. The molten glass is discharged from the heating chamber through small openings in the bottom wall of the heating chamber to form small streams of molten glass issuing from the openings. In one method of producing the continuous length glass filaments, the streams of molten glass that are discharged from the small openings in the heating chamber for the glass are frictionally grasped by jets of high pressure gas directed angularly upon opposite sides of the streams of molten glass to greatly increase the speed of forward advancement of the streams of molten glass between the point at which they are grasped by the high pressure jets of gas and the point of discharge from the heating chamber to produce a drawing of the streams of molten glass in the direction of their length, causing attenuation of the streams into fine filaments.

Another method of producing continuous length glass filaments is that of grasping the streams of glass issuing from the openings in the heating chamber by means of a mechanical device that is moved at a high speed so that the streams of glass that are in molten condition as they issue from the opening in the heating chamber will be drawn and attenuated into fine filaments by a positive mechanical pulling action.

The size of the openings in the heating chamber through which the molten glass issues is limited within a practical degree of small diameter because of friction of the flow of glass through the openings at the operating viscosity of the glass. Also, the degree of attenuation of the molten stream is affected by the diameter of the issuing molten stream to the extent that a given increase in speed of the stream after leaving the heating chamber will only produce a determined degree of attenuation depending on the ratio between the diameter of the stream and the rate of increase of speed of the stream in the portion being drawn and attenuated. That is, for a given speed increase, a molten stream of a given diameter can only be decreased or attenuated by a predetermined value. Since there is a practical limit on the minimum size of the openings through which the streams of molten glass issue, and there is a practical limit to the rate of increase of stream movement that can be produced either mechanically or by means of gas jets, there is a limitation on the size of glass filament that can be produced by the previously known methods of making such continuous length filaments as well as on the quantity of filament that can be produced in any given apparatus.

It is therefore an object of this invention to provide a method by which continuous length filaments of exceedingly fine diameter can be produced, or the speed at which filaments of larger commercially known diameters can be produced is greatly increased.

In the production of continuous length glass filaments, it is conventional to produce filaments having diameters as small as .0018" to .0025" in diameter. These filaments are gathered into strands and thereafter twisted into threads.

It is the purpose of this invention to greatly increase the speed at which continuous length filaments of commercially known diameters can be produced, such as those just mentioned or to produce continuous length filaments having greatly decreased diameters, such as those known as "superfine" filaments, which have diameters on the order of one-tenth of that of those referred to herein, and in some instances diameters as small as 2 or 3 microns. However, commercially produced "superfine" fibers have heretofore been of the staple variety, rather than of continuous length because of specialized methods of production that have been used in obtaining such small diameter fibers.

It is therefore another object of this invention to provide a method by which continuous length glass filaments can be produced of more greatly reduced diameter than has heretofore been considered practical.

In accomplishing the object of this invention, it is therefore another object of the invention to provide a method for producing fine glass filaments at high speeds of production in which molten glass is issued from a heating chamber in small streams or strands by the application of pressure on the body of glass in the heating chamber to force the molten glass through openings in the heating chamber in the small streams or strands at a constant rate of flow. The small strands of glass will thereafter be re-heated to an attenuation temperature by heating apparatus which also produces a high gaseous pressure which will be directed upon the strands of re-heated glass for drawing and attenuating the small strands into fine filaments.

In carrying forward the purposes of this invention, it is another object of the invention to provide a method for producing continuous length glass filaments by which a body of molten glass is placed under relatively high pressure to cause extrusion of the molten glass through a plurality of small openings by which relatively small diameter glass fibers are produced. These fibers, or glass strands, are allowed to cool sufficiently to become at least semi-rigid so that they can be directed through a second heating apparatus which is constructed and arranged to heat the individual glass fibers or strands to a temperature at which the strands can be attenuated, whereupon the strands are frictionally engaged by jets of high pressure gas directed upon opposite sides of the strand below the portion that is re-heated to cause attenuation of the strand in the re-heated portion thereof and thereby greatly reduce the diameter of the individual strands.

In accomplishing the foregoing object, it is still another object of the invention to utilize principles of the thermal jet to obtain high temperatures for rapidly reheating the glass fibers or strands while they move through the high temperature zone at a high rate of speed, and further to utilize the expansion of gases developed within a thermal jet engine to produce high pressure high velocity gas jets which frictionally grasp the fibers or strands below the portion being reheated to greatly increase the speed of movement of the strand and thereby draw and attenuate it in the reheated portion, thereby greatly reducing the diameter of the extruded strand as it issues from the heating chamber containing the body of molten glass.

It is still another object of the invention to provide a method for producing continuous length glass filaments in which fine glass fibers or strands are first produced from a body of molten glass, and the strands are then reheated as part of a continuous process to bring them to a high temperature so that the strands can be drawn and attenuated in the direction of their length to greatly reduce the diameter of the strands.

These and other objects of the invention will be more fully understood from the drawings and the following description.

In the drawings:

Figure 3 is a diagrammatic perspective view of another modified arrangement of apparatus illustrating direct heating of the fibers or strands;

Figure 4 is a perspective view of a part of the apparatus illustrated in Figure 3, but including mechanical means for collecting the attenuated glass filaments as they are produced;

Figure 5 is a diagrammatic perspective view of another modified form of apparatus for accomplishing the result of this invention utilizing fuel mixtures for heating the glass fibers or strands;

Figure 6 is a cross-sectional view taken along line 6—6 of Figure 5;

Figure 1:
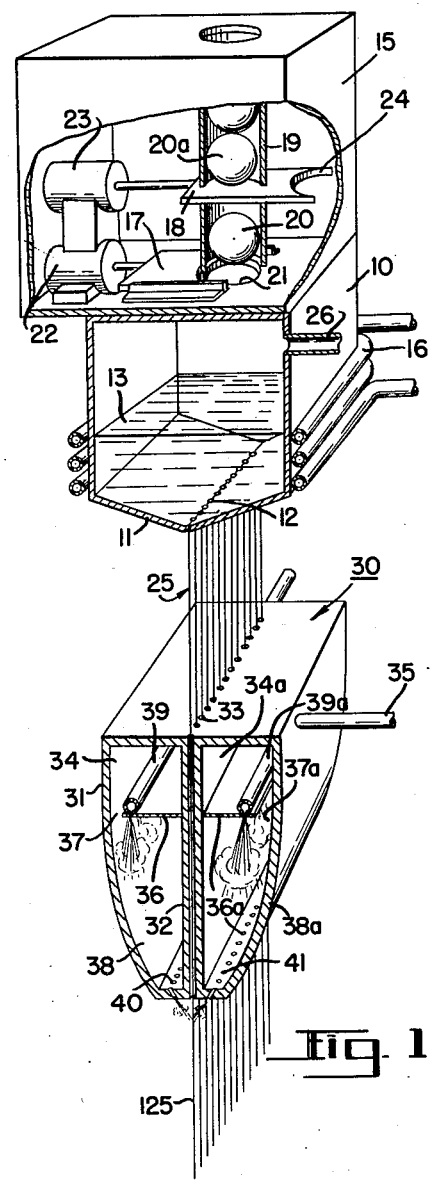
Figure 1 is a diagrammatic perspective view of apparatus for accomplishing the purposes of this invention by indirect heating of the glass fibers or strands and utilizing the principles of a ram jet thermal engine.

In this invention a body of glass is heated within a heating chamber to molten condition. The heating chamber is provided with a plurality of small openings in one wall, preferably the bottom wall, through which the molten glass within the chamber will be extruded by the application of pressure within the chamber upon the body of molten glass. The molten glass will issue from the openings in the heating chamber in small streams which will cool quickly as the streams leave the heating chamber to form small glass fibers or glass strands.

The openings in the heating chamber are sufficiently small that the glass streams issuing through the openings will be referred to in this description as fibers or strands. As the glass strands leave the openings in the heating chamber for the molten glass, the temperature of the strands falls rapidly. Thus, a very short distance from the discharge side of the openings, the strands are of a solid nature, even though at this time they are still of a relatively high temperature and thus retain substantially the same diameter as that of the opening.

The solidified glass fibers or strands are then conducted into a second high temperature heating zone of sufficient intensity to cause the strands to be reheated to within a temperature range at which they can be drawn and attenuated into fine glass filaments, the term filament identifying the drawn and attenuated strand. Since the glass strands or fibers are of very small diameter, the high temperature of the reheating zone will produce rapid temperature increase of the strands as they can pass through the zone at a high speed. As the glass strands or fibers leave the high temperature reheating zone, each strand or fiber is engaged by jets of high pressure high velocity gas that are directed angularly at opposite sides of the fiber or strand with the jets flowing in the direction of movement of the strands. The high pressure gas thus frictionally grasps the strand or fiber to increase the speed of forward movement of the strand in the direction of its length to a value much greater than that at which the strands are extruded from the body of molten glass, thus causing the strand in the area in which it is reheated to draw out and attenuate into a fine glass filament.

In producing the glass fibers or strands from the body of molten glass in the primary heating or melting chamber, the openings through which the glass is extruded may be on the order of .010" to .015". The glass will extrude from the openings at substantially this same diameter when pressure of from 5# to 10# per square inch is applied upon the body of molten glass within the melting or heating chamber with the glass heated to a temperature of from 2300° F. to 2400° F.

The amount of pressure applied upon the body of molten glass in the heating and melting chamber is regulated to cause extrusion of the glass fibers or strands at a rate just equal to that at which they can be heated in the secondary reheating zone to attenuation temperature of from 1800° F. to about 2100° F. The gas blasts or jets engaging the strand below the reheated zone will increase the rate of movement of the filament produced by the attenuation of the strand to a speed much greater than that at which the strand enters the reheating zone, thus drawing the strand into a fine filament in the order of .0001" to .00015" in diameter.

The degree of fineness to which the continuous length filament can be drawn after being reheated depends upon the ratio between the speed of advancement of the glass fiber or strand into the re-heating zone and the rate of increased speed applied to the filament below the re-heating zone. As the diameter of the glass fiber or strand decreases, the fineness to which the glass filament can be drawn is increased, and obviously the reverse is true.

In Figure 1 there is illustrated an apparatus for carrying forward the purposes and method of this invention. The apparatus consists of a heating or melting chamber 10 that has a bottom wall 11 provided with a plurality of small openings 12 arranged in a row across the bottom wall 11. The chamber 10 contains a body of molten glass 13 that is periodically replenished by a feeding mechanism 15.

The body of glass 13 is maintained in a molten condition by a heating coil 16 that surrounds the lower portion of the heating chamber 10. This heating coil 16 is preferably an electric induction coil, or a high frequency heating coil connected with suitable electric equipment or high frequency generating equipment for inducing electric energy into the coil 16 to maintain the body of glass 13 at a melting temperature of from 2300° F. to 2400° F.

The body of molten glass 11 is placed under a gaseous pressure that is delivered into the chamber 10 through a conduit 26 to cause the molten glass 13 to extrude through the openings 12.

The extrusion of molten glass through the openings 12 produces a glass fiber or strand that is substantially of the same diameter as the opening 12.

The feeding mechanism 15 for maintaining the supply of molten glass 13 at a relatively constant level consists of a pair of cooperating slide valves 17 and 18 that are spaced from one another and are adapted to alternately close a feeding tube 19 through which glass marbles 20 are fed into the chamber 10 through the feed opening 21. The slide valves 17 and 18 are operated in opposite directions by means of electric solenoids 22 and 23 respectively.

With the slide valves 17 and 18 in the position illustrated in Figure 1, the glass marble numbered 20 is released for dropping through the feed opening 21 into the chamber 10. The valve 18 closes off the feed tube 19 to prevent escape of gaseous pressure from within the heating chamber 10. After the marble 20 has dropped into the chamber 10, the solenoids 22 and 23 will be operated to reverse the position of the slide valves 17 and 18 so that valve 17 then closes off the tube 19 while the valve 18 aligns the recess 24 with the tube 19 to permit the glass marble 20a to drop upon the slide valve 17 ready for another feed drop into the chamber 10 upon reverse movement of the valves. Operation of the valves 17 and 18 thus provides a gas pressure trap to permit feeding of the glass marbles 20 without losing pressure from within the heating chamber 10. Thus, the body of molten glass 13 will always be under a substantially uniform degree of gaseous pressure as fed through the conduit 26 and as controlled by suitable pressure control devices.

The glass fibers or strands 25 that are extruded through the openings 12 cool rapidly upon leaving the heating chamber 10 so that at a short distance below the bottom wall 11 of the heating chamber 10 the fibers or strands 25 are solidified, even though their temperature is still relatively high, between 1200° F. to 1500° F.

The glass fibers or strands 25 are moved in the direction of their length at a uniform rate of speed by their extrusion from the chamber 10 in accordance with the value of the pressure that is applied upon the body of molten glass 13 in the chamber 10, thus providing a series of solidified glass fibers or strands arranged in a parallel row, or a common plane, which are fed as solidified fibers or strands into a second heating and attenuating apparatus 30 wherein the glass fibers or strands are re-heated to an attenuation temperature of from 1800° F. to 2100° F. so that the fibers or strands can be drawn in the direction of their length to attenuate the strands into fine glass filaments.

The heating and attenuating apparatus 30 consists of a closed pressure chamber 31 having an intermediate wall 32 that is provided with a series of longitudinally extending bores 33 into which the individual glass fibers or strands 25 are introduced, and from which attenuated glass filaments 125 are discharged.

The closed heating chamber 31 has the two compartments 34 and 34a interconnected across the ends of the chambers so that high pressure air delivered into the chamber 34a through the conduit 35 will also be delivered into the chamber 34.

The chambers 34 and 34a each have a horizontal partition wall 36 and 36a respectively which is secured to the intermediate wall 32 along one edge of the partition wall and has the opposite edge spaced from the wall of the chamber 31 to form passages 37 and 37a through which air under pressure is delivered into the lower compartments 38 and 38a of the chamber 31.

The air delivered into the compartments 38 and 38a is heated and expanded by the combustion of a fuel delivered into compartments 38 and 38a through the conduits 39 and 39a. The fuel used is preferably a liquid hydrocarbon which is introduced into the chamber under high pressure to spray the fuel into the compartments 38 and 38a for admixture with the air delivered thereinto to form a combustible mixture which upon burning greatly expands the air to develop exceedingly high pressure within the chambers 38 and 38a and produces a high temperature within the chambers 38 and 38a which heats the intermediate partition wall 32.

The delivery of air and fuel into the chambers 38 and 38a follows the principle of a thermal jet engine, and particularly a thermal jet engine of the ram type wherein large volumes of air are rammed into the chambers 38 and 38a into which combustible hydrocarbons are sprayed and burned to increase the temperature and pressure of the air for exhausting through jet openings, which in the chamber 31 are provided by series of holes 40 and 41 in the chambers 38 and 38a respectively.

By utilizing the principle of a thermal jet engine, high gaseous pressure and a high temperature are created which are used to quickly re-heat the glass fibers or strands as they are introduced into the heating and attenuating apparatus 30 and to attenuate the strands into fine glass fibers. Temperature on the order of 2000° F. or more is created in the chamber 31 by the combustion of the fuel, depending on the nature of the fuel used, so that the glass fiber or strand introduced into the openings 31 is re-heated by conduction and radiation from the wall 32 in the heating zone immediately below the partition walls 36 and 36a, whereby to elevate the temperature of the glass strand to approximately 1800° F.

The openings 40 and 41 in the bottom wall of the compartments 38 and 38a are in planar alignment with the holes 33 and are directed angularly toward the axis of the holes 33 so that jets of gas discharging from the openings 40 and 41 meet on the axis of the holes 33 with the jets of gas flowing in the direction of forward movement of the glass filaments 125. The jets of gas discharging from the openings 40 and 41 frictionally engage opposite sides of the glass filaments 125 to greatly increase the speed of forward movement of the filaments 125 and thereby attenuate the glass fibers or strands that have been re-heated to attenuation temperature in their passage through the holes 33. The attenuation of the glass fibers or strands 25 greatly reduces their diameters to obtain glass filaments 125 that are of much smaller diameter than the glass fibers or strands 25.

Since the glass fibers or strands 25 that enter the heating and attenuating apparatus 30 are of small diameter, they are heated quickly by the high temperature of the heating apparatus 30 to their attenuating temperatures so that rapid introduction of the glass fibers or strands into the heating and attenuating apparatus is possible. Thus, a greatly increased quantity of continuous length glass filament is obtained.

The size of the glass filaments 125 produced in the apparatus illustrated in Figure 1 depends largely on the diameter of the openings 12 in the primary heating chamber 10 and the degree of attenuation that can be given to the glass fibers or strands 25 by the jets in the secondary heating and attenuating apparatus in relation to the primary diameter of the fibers or strands 25. That is, for a given jet pressure discharging from the openings 40 and 41 there is a determined value of increased speed that can be given to the filaments 125. Thus, when the fibers or strands 25 enter the openings 33 at a diameter of .030" to .035", attenuation of the strands or fibers will produce a filament 125 of from .0002" to .0003", which are normally accepted commercial diameters of continuous length filaments that are utilized in the manufacture of glass thread and yarn.

As the diameter of the openings 12 is reduced to commercially accepted small size such as .010" to .015", the glass filaments 125 that are produced from glass fibers or strands extruded at the smaller diameters will be exceedingly smaller in their diameter than those produced from the fibers or strands extruded from the larger size openings in the heating chamber 10, in the latter instance the diameter of the filaments 125 being reduced to as much as one-tenth that of the aforementioned commercial type of filaments.

Figure 2:
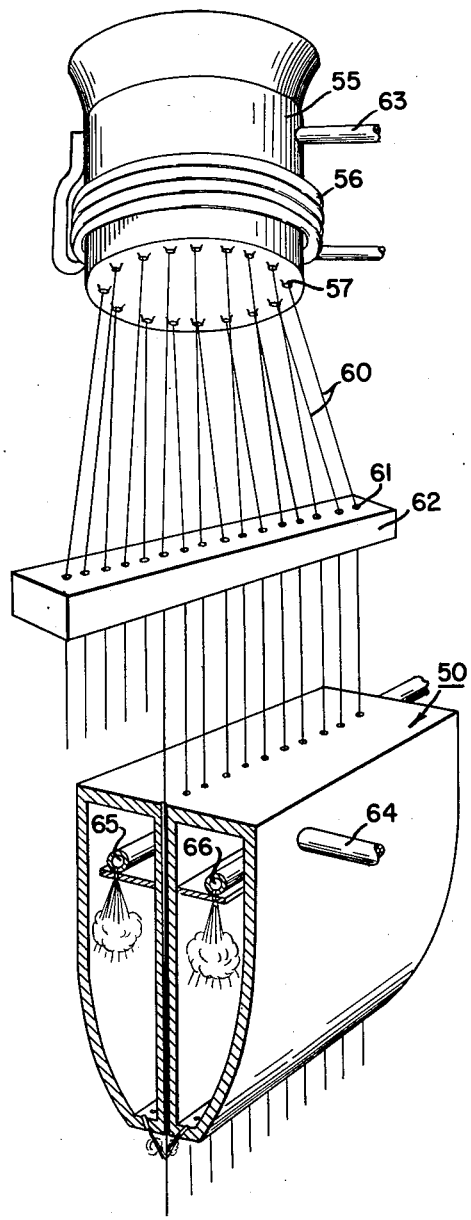
Figure 2 is a diagrammatic perspective view of apparatus similar to that of Figure 1 but illustrating a modified arrangement of the structure.

In Figure 2 there is illustrated a modified arrangement of the apparatus illustrated in Figure 2, wherein the heating and attenuating apparatus 50 is like the heating and attenuating apparatus 30 of the device shown in Figure 1, and functions in exactly the same way. However, the primary heating and melting apparatus 55 is in this instance circular in shape so that the heating coil 56, corresponding to the heating coil 16 of the device in Figure 1, is arranged circularly around the circular heating chamber 55. This provides for uniform heating of the body of molten glass within the chamber 55 when the heating coil 56 is connected to a suitable source of high frequency energy, such as a radio frequency generator delivering a high frequency current to the coil 56 at approximately 1.5 megacycles.

The bottom wall of the heating chamber 55 is provided with a plurality of openings 57 arranged circularly adjacent the outer periphery of the chamber 55, these openings 57 corresponding to the openings 12 in the heating chamber 10 disclosed in Figure 1. The glass fibers or strands 60 extruded through the openings 57 cool and solidify in the same manner as heretofore described with reference to the fibers or strands 25 so that the solidified fibers can be delivered through openings 61 in a guide member 62 to arrange the glass fibers or strands 60 into a planar arrangement for delivery into the secondary heating and attenuating apparatus 50.

Gaseous pressure is supplied to the chamber 55 through a conduit 63 to cause extrusion of the glass fibers or strands 60 in the manner heretofore described. Also, air under pressure is supplied to the heating and attenuating apparatus 50 through the pipe 64 and liquid fuel is admixed therewith through its delivery from the conduits 65 and 66 in the same manner as heretofore described with reference to the heating and attenuating apparatus 30 illustrated in Figure 1.

In all respects, the apparatus of Figure 2 operates in the same manner as the apparatus of Figure 1.

It will, of course, be understood that the primary heating apparatus 55 illustrated in Figure 2 can be substituted for the heating apparatus 10 illustrated in Figure 1 and for any other similar apparatus illustrated in the drawings of this invention, and that the feeding mechanism 15 illustrated in Figure 1 is adaptable for use with the heating apparatus 55 of Figure 2 to maintain a supply of molten glass in the heating chamber 55.

In Figure 3 there is shown another modified form of apparatus for producing the results of this invention wherein the primary heating apparatus 10b and the feeding mechanism 15b for the same are identical with the heating apparatus 10 and the feeding mechanism 15 of the apparatus shown in Figure 1, corresponding numbers being used but with the suffix "b" to identify the parts of the apparatus.

The secondary heating and attenuating apparatus 30b, similar to the heating and attenuating apparatus 30 of the apparatus of Figure 1, again utilizes the principles of a thermal jet engine to obtain high pressure for attenuating the glass fibers of strands 25b and high temperature to elevate the strands 25b to attenuating temperature. However, in the heating and attenuating apparatus 30b there is provided a direct heating of the strands 25b in place of the indirect heating illustrated in the apparatus of Figure 1.

In the heating and attenuating apparatus 30b, large volumes of air under pressure are delivered into the chambers 70 and 71 through the conduits 72 and 73 from a common source of air supply 74. The chambers 70 and 71 are each provided with a horizontal wall 75 and 76 respectively which forms an intermediate wall 77 having a series of holes 78 to receive the solidified fibers or strands 25b to guide them into the secondary heating chamber 80.

The walls 75 and 76 are in spaced relationship to the side walls of the apparatus 30b to form passages 81 and 82 through which large volumes of air are delivered into the chamber 80. Forming a part of each of the walls 75 and 76 are the fuel chambers 83 and 84 that are supplied with a liquid hydrocarbon fuel through the conduits 85 for delivery into the chamber 80 through nozzle openings provided in the walls 75 and 76.

The liquid fuel being delivered into the chamber 80 under pressure, and admixed with the air therein produces a combustible mixture which, upon burning of the fuel, produces a high temperature in the chamber 80 and creates a large volume of gas caused by the combustion of the fuel and expansion of the air which is discharged through a plurality of holes 90 provided in the lower end of the chamber 80.

The combustion of the fuel in the chamber 80 creates a temperature sufficient to heat the glass fibers or strands 25b that are passing through the chamber 80 to attenuation temperature, in the same manner as heretofore described, except that in this instance the heating is a direct heating instead of an indirect heating as illustrated in Figure 1. The large volume of high pressure gas produced in the chamber 80 exhausting through the openings 90 produces surface friction on the glass filaments 125b which greatly increases the speed of forward movement of the filaments 125b causing attenuation of the strands 25b in their re-heated area within the chamber 80, in the same manner as heretofore described.

In Figure 4 there is illustrated part of the apparatus shown in Figure 3, particularly the heating and attenuating apparatus 30b which is identical with that of the apparatus of Figure 3 so that the same reference numerals are used. However, the filaments 125b are in Figure 4 shown as being collected through an eye 91 and wound as a unified thread 92 upon a collecting reel 93.

In Figure 5 there is illustrated another modified arrangement of apparatus for obtaining the results of this invention wherein the heating and melting chamber 10c and the feeding mechanism 15c are identical with the corresponding apparatus of Figure 1 so that like numerals are applied, but with the suffix "c."

The secondary heating and attenuating apparatus 100 consists of fuel-receiving chambers 101 and 102 that are connected together at one end and supplied with a fuel mixture through the conduit 103. The fuel mixture supplied to the fuel chambers 101 and 102 may be a mixture of air and liquid hydrocarbons or air and alcohol or other suitable fuel mixtures for producing high temperature. The fuel mixture is introduced into the chambers under pressure and exhausts through a plurality of ports or jets 104 in the chamber 101, and ports 105 in the chamber 102.

The heating and attenuating apparatus 100 is also provided with combustion chambers 106 and 107 into which the fuel mixture is discharged from the chambers 101 and 102 respectively for combustion therein. Combustion of the fuel produces a large increase in the volume and pressure of gas in the chambers 106 and 107, and heats the intermediate walls 108 between the chambers 106 and 107 to a high temperature, which in turn heats the glass fibers or strands 25c to an attenuation temperature. The intermediate walls 108 provide a slot 109 that receives the glass fibers or strands, the slot terminating in a series of guide holes 110 at the bottom of the slot 109 to direct the glass filaments 125c in planar alignment with the jet openings 111 and 112 through which the high pressure gases discharge from the chambers 106 and 107 respectively. The jet openings 111 and 112 are directed angularly toward the axis of the holes 110 and converge at the axis so as to frictionally engage the glass filament 125c to increase its forward movement of advancement rapidly and thereby produce attenuation of the glass strands or fibers 25c in their re-heated area between the walls 108 in the slot 109.

The structure shown in Figure 5 operates in the same manner as the apparatus heretofore described, the only exception being that a fuel mixture is supplied to the chambers 101 and 102 for delivery into the combustion chambers rather than having the air and fuel admitted separately into the combustion chamber as heretofore described.

Figure 7:
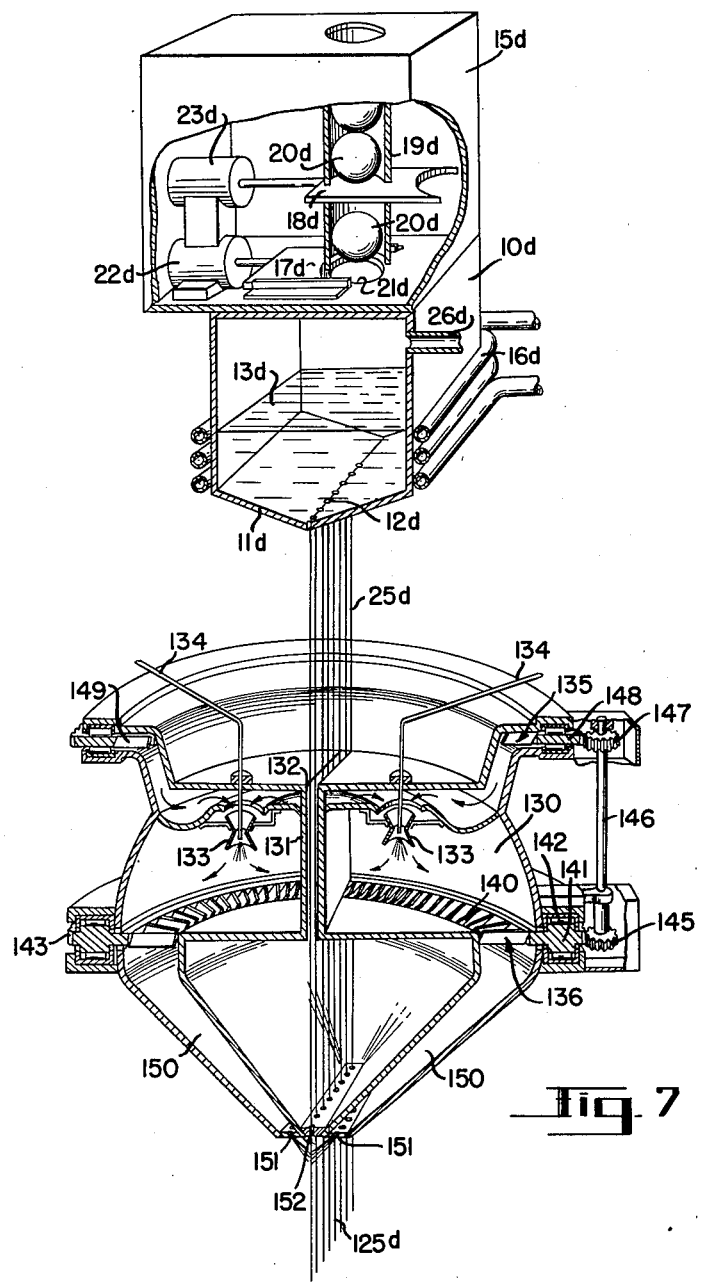
Figure 7 is a diagrammatic perspective view of another modified arrangement of apparatus for obtaining the results of this invention by which the principles of a turbo jet thermal engine are used.

In Figure 7 there is illustrated another modified arrangement of apparatus for producing continuous length glass filaments according to the teachings of this invention. In this arrangement the heating and melting chamber 10d and the feeding mechanism 15d is like that heretofore described with reference to the apparatus of Figure 1 so that like numerals are applied thereto but with the suffix "d."

The heating and attenuating apparatus of Figure 7 utilizes the principles of a thermal jet engine of the turbojet type wherein the burning of fuel in a large volume of pressurized air creates high temperature and increases the pressure of the air, the high temperature being utilized to re-heat the glass fibers or strands produced by the heating apparatus 10d and the high pressure of the gases being utilized to drive a gas turbine. The spent gases from the turbine are used to draw and attenuate the glass fibers or strands into glass filaments. The gas turbine, in turn, drives a centrifugal compressor to supply the large volume of air under pressure required for operation of the device.

The heating and attenuating apparatus of Figure 7 consists of a combustion chamber 130 having an intermediate double partition wall 131 forming a slot 132 through which the glass fibers or strands 25d are passed. Fuel, such as liquid hydrocarbon, is introduced into the combustion chamber by means of the fuel jets 133 supplied with fuel through the pipes 134. Air under pressure is supplied into the combustion chamber 130 by means of a centrifugal compressor 135 that is driven by a turbine 136 placed in the discharge side of the combustion chamber 130.

As shown in the drawings, the turbine 136 consists of a plurality of vanes 140 carried on a rotating ring 141 supported on roller bearings 142. The outer periphery of the ring 141 forms a gear 143 that drives a pinion 145. The pinion 145 is secured on the lower end of a drive shaft 146 which receives the pinion 147 on the upper end thereof which drives the ring gear 148 of the centrifugal compressor 135, the ring gear 148 carrying the vanes 149 of the compressor 135.

Combustion of the fuel in the chamber 130 produces high gas pressures which drive the turbine 136 by the passage of gas through the vanes 140. The spent gases passing through the turbine then pass into the chamber 150.

The gas in the chamber 150 is discharged therefrom through jet openings 151 placed at opposite sides of the openings 152 and in planar alignment therewith for engaging opposite sides of the glass filaments 125d for attenuation of the strand 25d upon being re-heated in passage between the walls 131 of the combustion chamber 130.

It will thus be seen that the principles of the turbojet type of thermal jet engine have been applied to the heating and attenuating apparatus of Figure 7 so that the high temperatures and high pressures developed by this type of thermal engine can be utilized in the drawing and attenuation of continuous length glass filaments.

While the various apparatus disclosed and described herein constitute preferred structures for performing the method of producing continuous length glass filaments utilizing principles of the invention, yet it will be understood that both the apparatus and the method performed by the apparatus are capable of modification without departing from the spirit of the invention, and that modifications that fall within the scope of the appended claims are intended to be included herein.

Having thus fully described my invention, what I claim as new and desire to secure by Letters Patent, is:

1. The method of producing continuous length glass filaments that consists of, pressure extruding molten glass into small glass strands, allowing for solidification of the glass strands, delivering the so solidified glass strands into a heating chamber at the same rate at which they are extruded, re-heating the solidified glass strands in the heating chamber to an elevated temperature at which the strands can be drawn in the direction of their length with simultaneous attenuation, and thereafter engaging the so re-heated strands at opposite sides of the strands immediately after being re-heated with means moving at a high velocity and in the direction of the advancement of the strands to increase greatly the speed of forward advancement of the glass strands in their re-heated areas causing drawing with simultaneous attenuation thereof into fine glass filaments.

2. The method of producing continuous length glass filaments that consists of, applying pressure upon a body of molten glass retained within a circular heating chamber and having a plurality of openings in the bottom wall of the circular chamber arranged circularly in the bottom wall for extrusion of the molten glass through the openings, allowing for solidification of the so extruded glass strands, guiding the so solidified glass strands through a high temperature chamber for re-heating of the solidified strands to a drawing and attenuation temperature in passing through the high temperature chamber at the rate of their extrusion from the circular chamber, and thereafter engaging the re-heated strands at opposite sides of the strands immediately after being re-heated with means moving at high velocity and in the direction of movement of the strands to greatly increase the speed of forward movement of the strands and draw them in the direction of their length with simultaneous attenuation producing fine glass filaments.

HARRY A. TOULMIN, Jr.

References Cited in the file of this patent

UNITED STATES PATENTS

| Number | Name | Date |
|---|---|---|
| 2,269,459 | Kleist | Jan. 13, 1942 |
| 2,294,266 | Barnard | Aug. 25, 1942 |
| 2,489,242 | Slayter et al. | Nov. 22, 1949 |
| 2,571,025 | Fletcher | Oct. 9, 1951 |